US012592503B2

(12) United States Patent
Lin et al.

(10) Patent No.: US 12,592,503 B2
(45) Date of Patent: Mar. 31, 2026

(54) CABLE CONNECTOR ASSEMBLY

(71) Applicant: Cheng Uei Precision Industry Co., Ltd., New Taipei City (TW)

(72) Inventors: Lin Yean Lin, New Taipei City (TW); Shih Hsun Tu, New Taipei City (TW)

(73) Assignee: Cheng Uei Precision Industry Co., Ltd., New Taipei City (TW)

( * ) Notice: Subject to any disclaimer, the term of this patent is extended or adjusted under 35 U.S.C. 154(b) by 342 days.

(21) Appl. No.: 18/398,072

(22) Filed: Dec. 27, 2023

(65) Prior Publication Data

US 2024/0291182 A1 Aug. 29, 2024

(30) Foreign Application Priority Data

Feb. 23, 2023 (CN) ......................... 202320352744.4

(51) Int. Cl.
*H01R 12/53* (2011.01)

(52) U.S. Cl.
CPC .................................... *H01R 12/53* (2013.01)

(58) Field of Classification Search
CPC ...................................................... H01R 12/53
See application file for complete search history.

(56) References Cited

U.S. PATENT DOCUMENTS 10,103,453 B2 * 10/2018 Pao ........................ H01R 12/53
2019/0190213 A1 * 6/2019 Wu .................... H01R 13/6593
2019/0288418 A1 * 9/2019 Zhong .................... H01R 12/53
2024/0291182 A1 * 8/2024 Lin ........................ H01R 12/53

* cited by examiner

*Primary Examiner* — Abdullah A Riyami
*Assistant Examiner* — Nader J Alhawamdeh

(57) ABSTRACT

A cable connector assembly includes a circuit board, a grounding structure and two low-speed signal cables. The circuit board has an upper surface, and a lower surface opposite to the upper surface. The upper surface is provided with a low-speed signal grounding section and a first low-speed signal conducting section. The lower surface is provided with a second low-speed signal conducting section. The grounding structure is fastened on the circuit board. The two low-speed signal cables include a first low-speed signal cable and a second low-speed signal cable. The first low-speed signal cable and the second low-speed signal cable are mounted to the upper surface and the lower surface of the circuit board, respectively. The first low-speed signal cable and the second low-speed signal cable are disposed oppositely along an up-down direction.

13 Claims, 8 Drawing Sheets

CABLE CONNECTOR ASSEMBLY

CROSS-REFERENCE TO RELATED APPLICATIONS

The present application is based on, and claims priority from, China Patent Application No. 202320352744.4, filed Feb. 23, 2023, the disclosure of which is hereby incorporated by reference herein in its entirety.

PRIOR ART

Generally, a cable connector assembly includes an insulating body, and a plurality of circuit modules received in the insulating body. Each circuit module has a circuit board received in the insulating body, a grounding lug fixed to the circuit board, and a plurality of coaxial cables. Each coaxial cable has a conductive core wire, an inner insulation layer wrapped around the conductive core wire, a metal shielding layer wrapped around the inner insulation layer, and an outer insulation layer wrapped around an outermost layer of the coaxial cable. One end of the outer insulation layer of each coaxial cable is peeled off, the metal shielding layer of each coaxial cable is partially exposed outside. The metal shielding layer which is partially exposed outside is soldered to the ground lug, and the conductive core wire is soldered to the circuit board.

A conventional cable connector assembly includes a circuit board, a plurality of conductive terminals, a plurality of conductive soldering pads disposed to a surface of the circuit board, a grounding lug disposed on the surface of the circuit board, and a plurality of coaxial cables. Each coaxial cable has a conductive core wire, an inner insulating layer covering the conductive core wire, a braided layer covering the inner insulating layer, and an outer insulating layer covering the braided layer. The conductive core wires of the plurality of the coaxial cables are fixed to the plurality of the conductive soldering pads, and the conductive core wires of the plurality of the coaxial cables are electrically connected to a plurality of conductive terminals by a soldering way. The braided layer is fixed to the grounding lug by the soldering way. The grounding lug is able to be effectively grounded with the plurality of the coaxial cables so as to avoid causing signal interferences between the plurality of the coaxial cables and the plurality of the conductive terminals.

Each coaxial cable of the conventional cable connector assembly includes the conductive core wire, and the inner insulating layer, a shielding layer and an outer insulating layer sequentially wrapped around an outside of the conductive material. The shielding layer is arranged as a grounding line, and the shielding layer is soldered to a grounding section of the circuit board to achieve a grounding effect of the plurality of the coaxial cables and avoid a signal interference. The conductive core wires of the plurality of the coaxial cables are generally soldered on the circuit board by a hot-bar process, soldering pastes are coated to soldering areas of the circuit board at first, and then melt the soldering pastes by heating, fore example, the soldering pastes pass through a reflow oven, and then place the conductive core wires of the plurality of the coaxial cables on the soldering areas coated with the melted soldering pastes, and utilize a thermode to solder the conductive core wires of the plurality of the coaxial cables to the circuit board with a press soldering way. So that the plurality of the coaxial cables are able to be soldered to the circuit board in one time.

However, the shielding layer of each coaxial cable is usually made of non-magnetic conductive materials which are copper foils, aluminium foils and so on, and the copper foils and the aluminium foils are braided mesh shapes. In a process of the shielding layer which is the braided mesh shape is soldered to the circuit board by the hot-bar process, a shielding layer dispersing condition and a shielding layer diverging condition are probably occurred to cause a soldering defect condition, so the shielding layers of the plurality of the coaxial cables have no way of effectively achieving anti-interference effects.

Therefore, it is necessary to provide an innovative cable connector assembly which is able to improve a grounding way of coaxial cables of the innovative cable connector assembly to overcome a problem that shielding layers of the coaxial cables are difficult to be soldered to the circuit board, and anti-interference capabilities of the coaxial cables are effectively improved.

BACKGROUND OF THE INVENTION

The present invention generally relates to a cable connector assembly, and more particularly to a cable connector assembly which is able to improve a grounding way of coaxial cables.

SUMMARY OF THE INVENTION

An object of the present invention is to provide a cable connector assembly. The cable connector assembly includes a circuit board, a grounding structure and two low-speed signal cables. The circuit board has an upper surface, and a lower surface opposite to the upper surface. The upper surface is provided with a low-speed signal grounding section and a first low-speed signal conducting section. The lower surface is provided with a second low-speed signal conducting section. The grounding structure is fastened on the circuit board. The grounding structure includes a base portion, and two clamping portions perpendicularly bent oppositely from the base portion. The base portion is electrically conductive with the low-speed signal grounding section. The two clamping portions include an upper clamping section positioned on the upper surface, and a lower clamping section positioned at the lower surface. The two low-speed signal cables are mounted at one side of the upper surface and one side of the lower surface of the circuit board. The two low-speed signal cables are electrically connected to the circuit board. The two low-speed signal cables include a first low-speed signal cable and a second low-speed signal cable. The first low-speed signal cable and the second low-speed signal cable are mounted to the upper surface and the lower surface of the circuit board, respectively. Each low-speed signal cable has a low-speed signal conduction core, a first inner insulation layer covered outside the low-speed signal conduction core, and a shielding layer covered outside the first inner insulation layer. The low-speed signal conduction core of the first low-speed signal cable is electrically connected to the first low-speed signal conducting section. The low-speed signal conduction core of the second low-speed signal cable is electrically connected to the second low-speed signal conducting section. The first low-speed signal cable and the second low-speed signal cable are disposed oppositely along an up-down direction. The shielding layer of the first low-speed signal cable is clamped by the upper clamping section, and the shielding layer of the second low-speed signal cable is clamped by the lower clamping section.

Another object of the present invention is to provide a cable connector assembly. The cable connector assembly includes a circuit board, a grounding structure, a first low-speed signal cable, a second low-speed signal cable and a plurality of high-speed signal cables. The circuit board has an upper surface, and a lower surface opposite to the upper surface. The upper surface is provided with a low-speed signal grounding section, a first low-speed signal conducting section positioned in front of the low-speed signal grounding section, a plurality of first high-speed signal grounding sections and a plurality of first high-speed signal conducting sections. The low-speed signal grounding section, the plurality of the first high-speed signal grounding sections and the plurality of the first high-speed signal conducting sections are arranged along a transverse direction. Rears of the plurality of the first high-speed signal grounding sections are aligned with rears of the plurality of the first high-speed signal conducting sections along the transverse direction. The lower surface is provided with a second low-speed signal conducting section, a plurality of second high-speed signal grounding sections and a plurality of second high-speed signal conducting sections. A rear of the second low-speed signal conducting section is aligned with the plurality of the second high-speed signal grounding sections and the plurality of the second high-speed signal conducting sections along the transverse direction. The grounding structure is fastened on the circuit board. The grounding structure includes a base portion, an upper clamping section and a lower clamping section. The base portion is soldered to the low-speed signal grounding section. The base portion is electrically conductive with the low-speed signal grounding section. The upper clamping section is fastened on the upper surface of the circuit board. The upper clamping section is bent upward from two sides of a front end of the base portion. The lower clamping section is disposed at a rear edge of the circuit board, and the lower clamping section is bent downward from two sides of a rear end of the base portion. The first low-speed signal cable is mounted to one side of the upper surface of the circuit board. The first low-speed signal cable has a low-speed signal conduction core soldered to the first low-speed signal conducting section, and a shielding layer clamped by the upper clamping section. The low-speed signal conduction core of the first low-speed signal cable is electrically connected to the first low-speed signal conducting section. The second low-speed signal cable is mounted to one side of the lower surface of the circuit board. The second low-speed signal cable has a low-speed signal conduction core soldered to the second low-speed signal conducting section, and a shielding layer clamped by the lower clamping section. The low-speed signal conduction core of the second low-speed signal cable is electrically connected to the second low-speed signal conducting section. The plurality of the high-speed signal cables are mounted at the other side of the upper surface and the other side of the lower surface of the circuit board. The plurality of the high-speed signal cables are disposed symmetrically with respect to the circuit board. The plurality of the high-speed signal cables have a plurality of high-speed signal conduction cores soldered to the plurality of the first high-speed signal conducting sections and the plurality of the second high-speed signal conducting sections.

Another object of the present invention is to provide a cable connector assembly. The cable connector assembly includes a circuit board, a grounding structure, two low-speed signal cables and a plurality of high-speed signal cables. The circuit board has an upper surface, and a lower surface opposite to the upper surface. The upper surface is provided with a low-speed signal grounding section and a first low-speed signal conducting section. The lower surface is provided with a second low-speed signal conducting section. The grounding structure is fastened on the circuit board. The grounding structure includes a base portion and two clamping portions. The base portion is electrically conductive with the low-speed signal grounding section. The two clamping portions include an upper clamping section and a lower clamping section. The upper clamping section is bent upward from two sides of a front end of the base portion. The upper clamping section is fastened to a top surface of the low-speed signal grounding section. The lower clamping section is bent downward from two sides of a rear end of the base portion, and the lower clamping section is disposed at a rear edge of the circuit board. The two low-speed signal cables are mounted at one side of the upper surface and one side of the lower surface of the circuit board. The two low-speed signal cables are electrically connected to the circuit board. The two low-speed signal cables include a first low-speed signal cable and a second low-speed signal cable. The first low-speed signal cable and the second low-speed signal cable are mounted to the upper surface and the lower surface of the circuit board, respectively. Each low-speed signal cable has a low-speed signal conduction core, a first inner insulation layer covered outside the low-speed signal conduction core, and a shielding layer covered outside the first inner insulation layer. The low-speed signal conduction core of the first low-speed signal cable is electrically connected to the first low-speed signal conducting section. The low-speed signal conduction core of the second low-speed signal cable is electrically connected to the second low-speed signal conducting section. The first low-speed signal cable and the second low-speed signal cable are disposed oppositely along an up-down direction. The shielding layer of the first low-speed signal cable is clamped by the upper clamping section, and the shielding layer of the second low-speed signal cable is clamped by the lower clamping section. The two low-speed signal cables are connected with the grounding structure via the shielding layers of the two low-speed signal cables. The plurality of the high-speed signal cables are mounted at the other side of the upper surface and the other side of the lower surface of the circuit board. The plurality of the high-speed signal cables are disposed symmetrically with respect to the circuit board.

As described above, the cable connector assembly includes the two low-speed signal cables and the plurality of the high-speed signal cables disposed to the upper surface and the lower surface of the circuit board, and the grounding structure fixed to the low-speed signal grounding section of the upper surface of the circuit board, the plurality of the high-speed signal cables are soldered to the upper surface and the lower surface of the circuit board by a way of hot-bar process, the two low-speed signal cables are clamped by the two clamping portions of the grounding structure, the shielding layer of the low-speed signal cable of the upper surface of the circuit board is clamped by the upper clamping section, the shielding layer of the low-speed signal cable of the lower surface of the circuit board is clamped by the lower clamping section, the base portion of the grounding structure is electrically connected to the low-speed signal grounding section of the upper surface of the circuit board, so that the shielding layers of the two low-speed signal cables are electrically connected to the low-speed signal grounding section of the upper surface of the circuit board through the grounding structure, and the first low-speed signal cable and the second low-speed signal cable of the two low-speed signal cables achieve a common ground structure to reach a better grounding effect. In this way, the cable connector assembly is able to improve a grounding way of the two low-speed signal cables which are coaxial cables of the cable connector assembly to overcome a problem that the shielding layers of the two low-speed signal cables are difficult to be soldered to the circuit board, and anti-interference capabilities of the two low-speed signal cables are effectively improved. In addition, the lower surface of the circuit board is needless to be provided with the low-speed signal grounding section, a wire layout range of the circuit board is increased. Furthermore, the upper clamping section and the lower clamping section are provided in pairs, and the upper clamping section and the lower clamping section are disposed oppositely along the up-down direction to reduce a volume of the grounding structure.

BRIEF DESCRIPTION OF DRAWINGS

The present invention will be apparent to those skilled in the art by reading the following description, with reference to the attached drawings, in which.

DETAILED DESCRIPTION OF THE INVENTION

Figure 1:
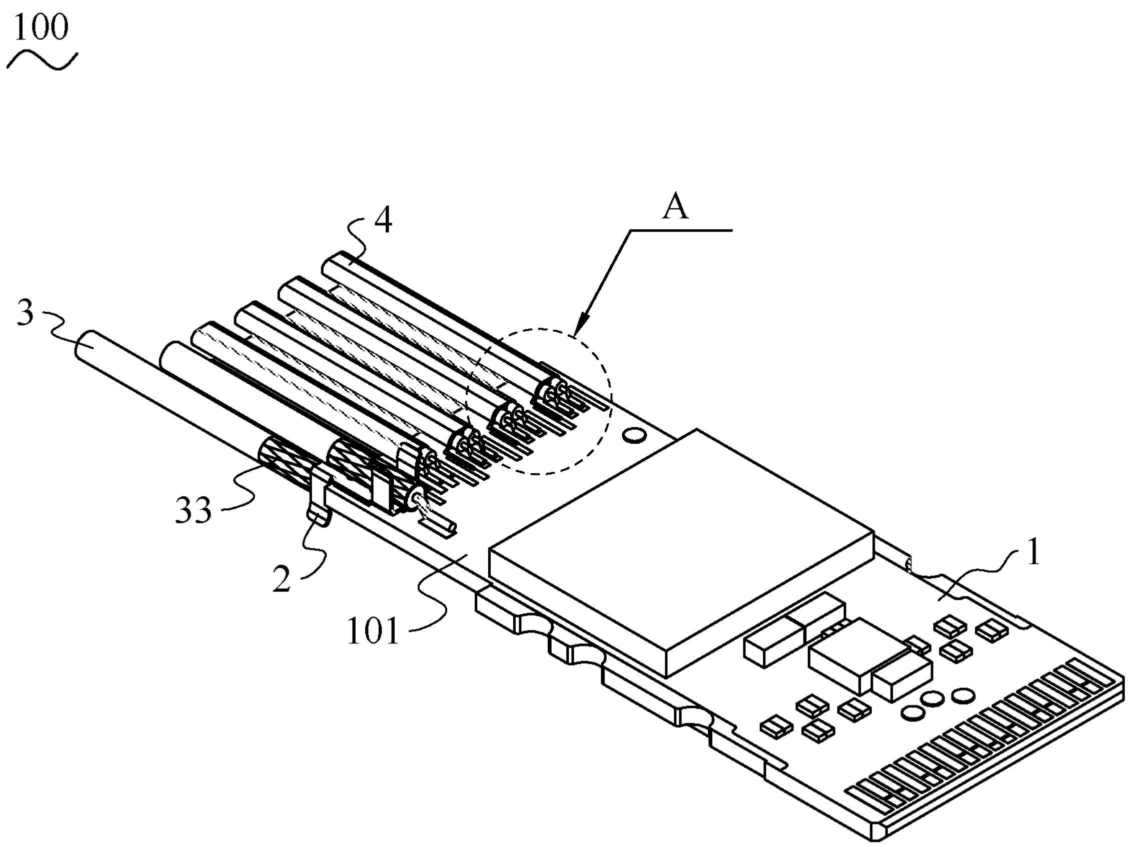
FIG. 1 is a perspective view of a cable connector assembly in accordance with a preferred embodiment of the present invention.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments.

Referring to FIG. 1 to FIG. 4, a cable connector assembly 100 in accordance with a preferred embodiment of the present invention is shown. The cable connector assembly 100 includes a circuit board 1, a grounding structure 2 fastened on the circuit board 1, and two low-speed signal cables 3 and a plurality of high-speed signal cables 4 electrically connected to the circuit board 1.

The circuit board 1 has an upper surface 101, and a lower surface 102 opposite to the upper surface 101. The two low-speed signal cables 3 are mounted at one side of the upper surface 101 and one side of the lower surface 102 of the circuit board 1. The two low-speed signal cables 3 are electrically connected to the circuit board 1. The plurality of the high-speed signal cables 4 are mounted at the other side of the upper surface 101 and the other side of the lower surface 102 of the circuit board 1. The plurality of the high-speed signal cables 4 are disposed symmetrically with respect to the circuit board 1. One low-speed signal cable 3 and the high-speed signal cables 4 disposed at the upper surface 101 of the circuit board 1 are arranged transversely. The other low-speed signal cable 3 and the high-speed signal cables 4 disposed at the lower surface 102 of the circuit board 1 are arranged transversely.

The upper surface 101 is provided with a low-speed signal grounding section 11, a first low-speed signal conducting section 121, a first high-speed signal grounding section 131 and a first high-speed signal conducting section 141. The lower surface 102 is provided with a second low-speed signal conducting section 122, a second high-speed signal grounding section 132, and a second high-speed signal conducting section 142. Preferably, the upper surface 101 is provided with a plurality of the first high-speed signal grounding sections 131 and a plurality of the first high-speed signal conducting sections 141, and the lower surface 102 is provided with a plurality of the second high-speed signal grounding sections 132 and a plurality of the second high-speed signal conducting sections 142. The grounding structure 2 is fixed to the low-speed signal grounding section 11, and the grounding structure 2 is electrically connected to the low-speed signal grounding section 11. The grounding structure 2 clamps the two low-speed signal cables 3 for making the two low-speed signal cables 3 achieve a grounding effect. In this preferred embodiment, the lower surface 102 of the circuit board 1 is needless to provide with the low-speed signal grounding section 11, so the low-speed signal cable 3 which is arranged on the lower surface 102 is electrically connected to the low-speed signal grounding section 11 which is mounted on the upper surface 101 of the circuit board 1 via the grounding structure 2 to achieve a grounding requirement.

Figure 5:
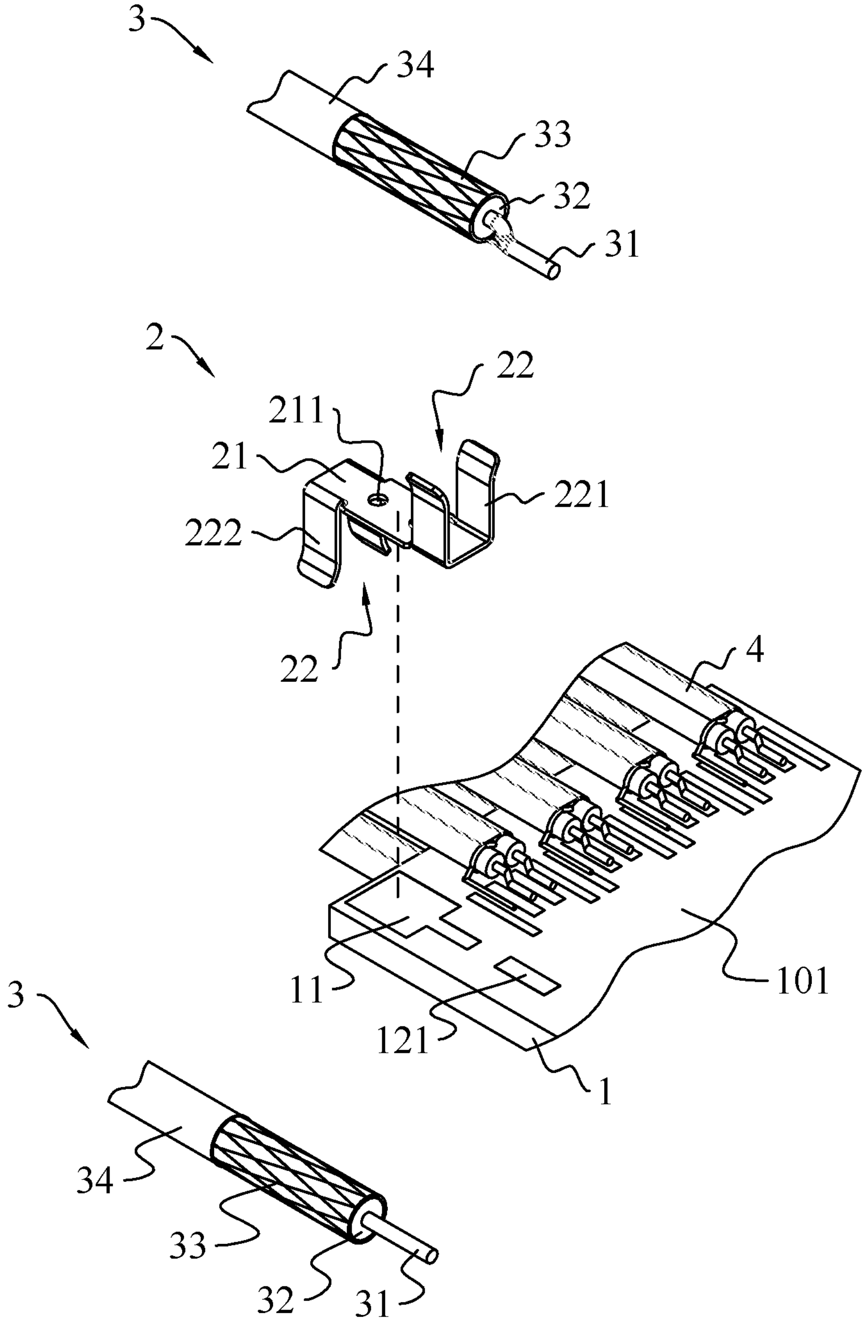
FIG. 5 is a partially exploded view of the cable connector assembly in accordance with the preferred embodiment of the present invention.

Referring to FIG. 5, the grounding structure 2 is made of a conductive material. The grounding structure 2 includes a base portion 21, and a clamping portion 22 perpendicularly bent from the base portion 21. The base portion 21 is formed in a flat shape. The base portion 21 is fastened on a top surface of the low-speed signal grounding section 11. The base portion 21 is electrically connected to the low-speed signal grounding section 11. The base portion 21 is electrically conductive with the low-speed signal grounding section 11. The base portion 21 is mounted on the upper surface 101 of the circuit board 1. In the preferred embodiment, the grounding structure 2 includes two clamping portions 22 perpendicularly bent oppositely from the base portion 21. The clamping portion 22 clamps the two low-speed signal cables 3. The two low-speed signal cables 3 are fixed by the clamping portion 22. In this preferred embodiment, the grounding structure 2 is integrated with the circuit board 1, or the base portion 21 is soldered to the low-speed signal grounding section 11 to fasten the grounding structure 2 to the circuit board 1.

The base portion 21 further has an opening hole 211 vertically penetrating through the base portion 21. When the grounding structure 2 is soldered to the circuit board 1, the opening hole 211 accommodates overflowing solders to prevent the grounding structure 2 having a floating height or a tilt. In the preferred embodiment, the two clamping portions 22 include an upper clamping section 221 positioned on the upper surface 101 of the circuit board 1, and a lower clamping section 222 positioned at the lower surface 102 of the circuit board 1. The upper clamping section 221 is arranged to clamp the low-speed signal cable 3 which is fastened on the upper surface 101, and the lower clamping section 222 is arranged to clamp the low-speed signal cable 3 which is positioned at the lower surface 102. The upper clamping section 221 is bent upward from two sides of a front end of the base portion 21. The upper clamping section 221 is fastened to the top surface of the low-speed signal grounding section 11, or the upper clamping section 221 is positioned between the low-speed signal grounding section 11 and the first low-speed signal conducting section 121. The lower clamping section 222 is disposed at a rear edge of the circuit board 1, and the lower clamping section 222 is bent downward from two sides of a rear end of the base portion 21.

Figure 2:
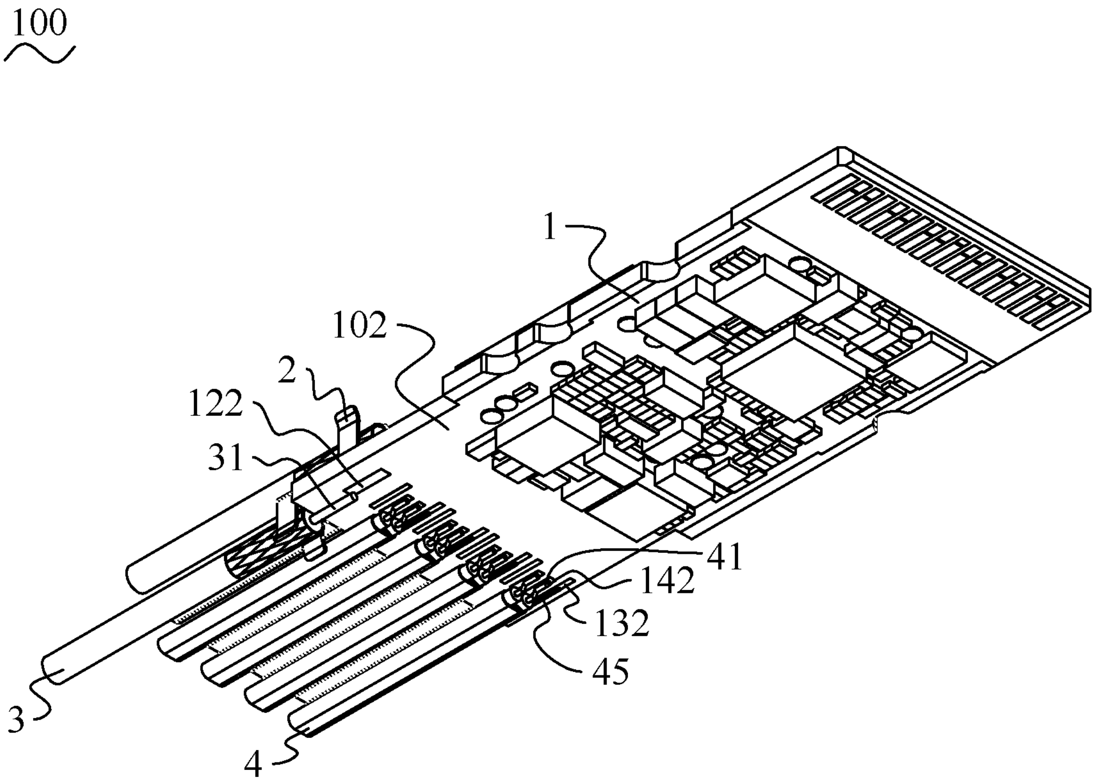
FIG. 2 is another perspective view of the cable connector assembly in accordance with the preferred embodiment of the present invention.
Figure 3:
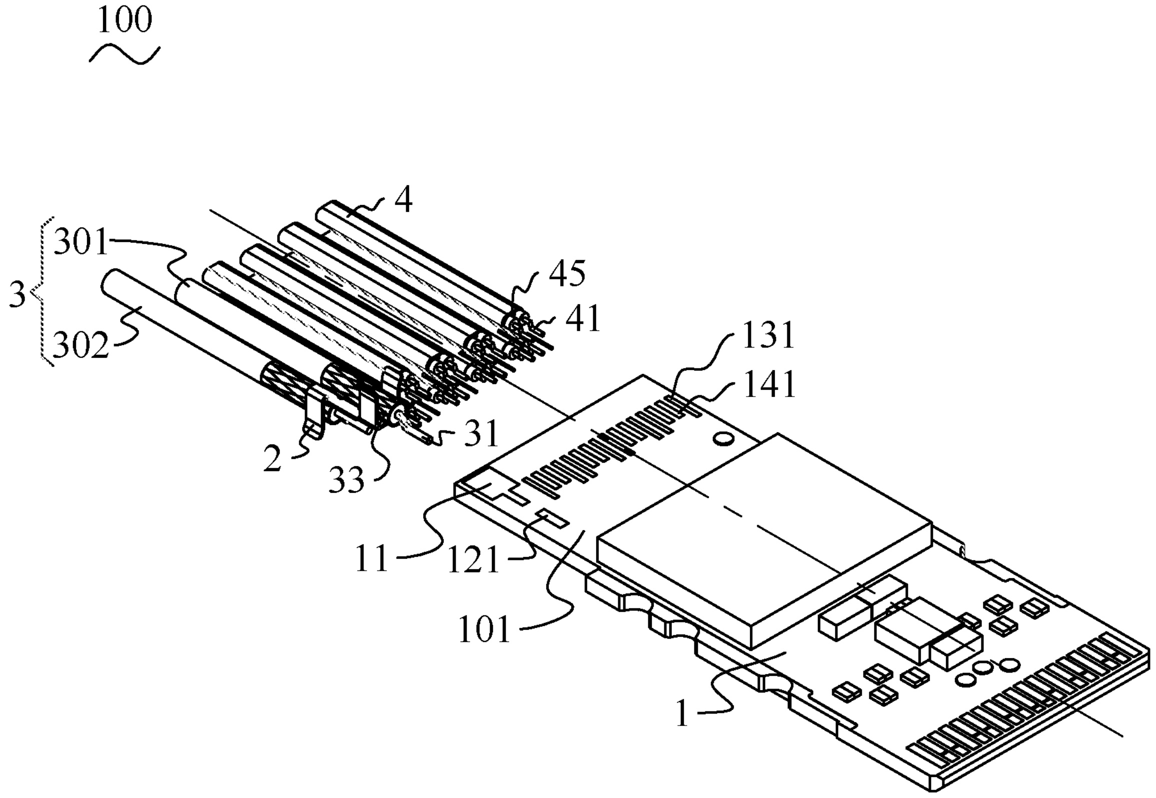
FIG. 3 is an exploded view of the cable connector assembly in accordance with the preferred embodiment of the present invention.
Figure 4:
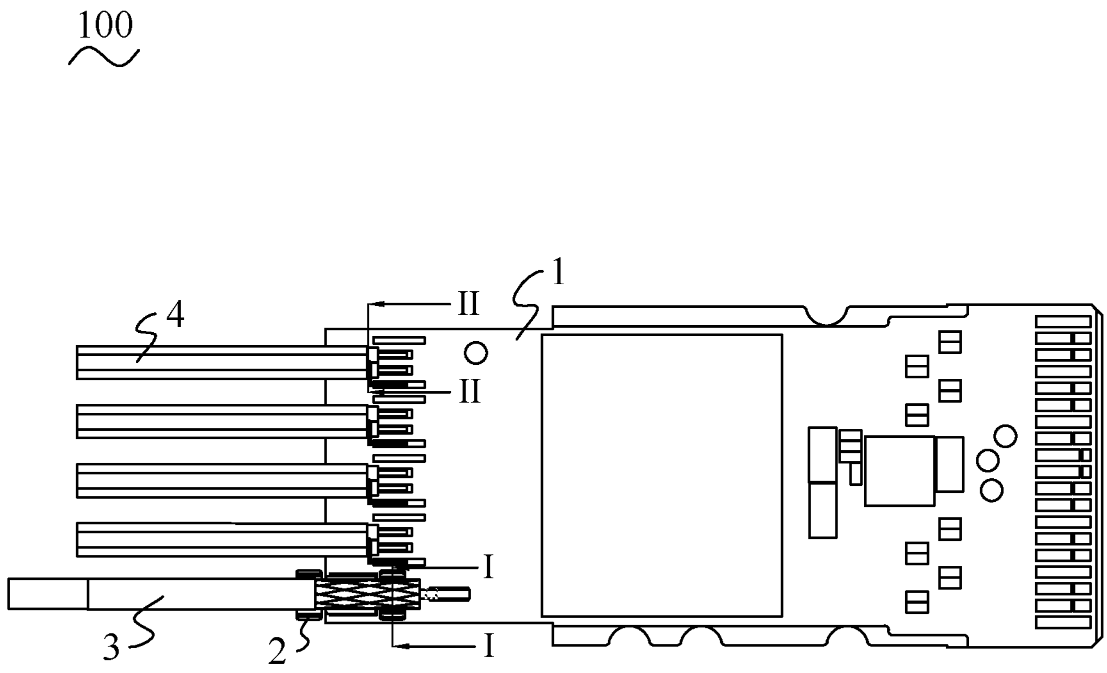
FIG. 4 is a top view of the cable connector assembly in accordance with the preferred embodiment of the present invention.

Referring to FIG. 1, FIG. 2 and FIG. 5, the two low-speed signal cables 3 are coaxial cables. The two low-speed signal cables 3 include a first low-speed signal cable 301 and a second low-speed signal cable 302. The first low-speed signal cable 301 is mounted to the one side of the upper surface 101 of the circuit board 1. The second low-speed signal cable 302 is mounted to the one side of the lower surface 102 of the circuit board 1. The first low-speed signal cable 301 is clamped to the upper clamping section 221 to make the first low-speed signal cable 301 be electrically connected to the low-speed signal grounding section 11 via the grounding structure 2. The second low-speed signal cable 302 is clamped to the lower clamping section 222 to make the second low-speed signal cable 302 be electrically connected to the low-speed signal grounding section 11 via the grounding structure 2.

Figure 6:
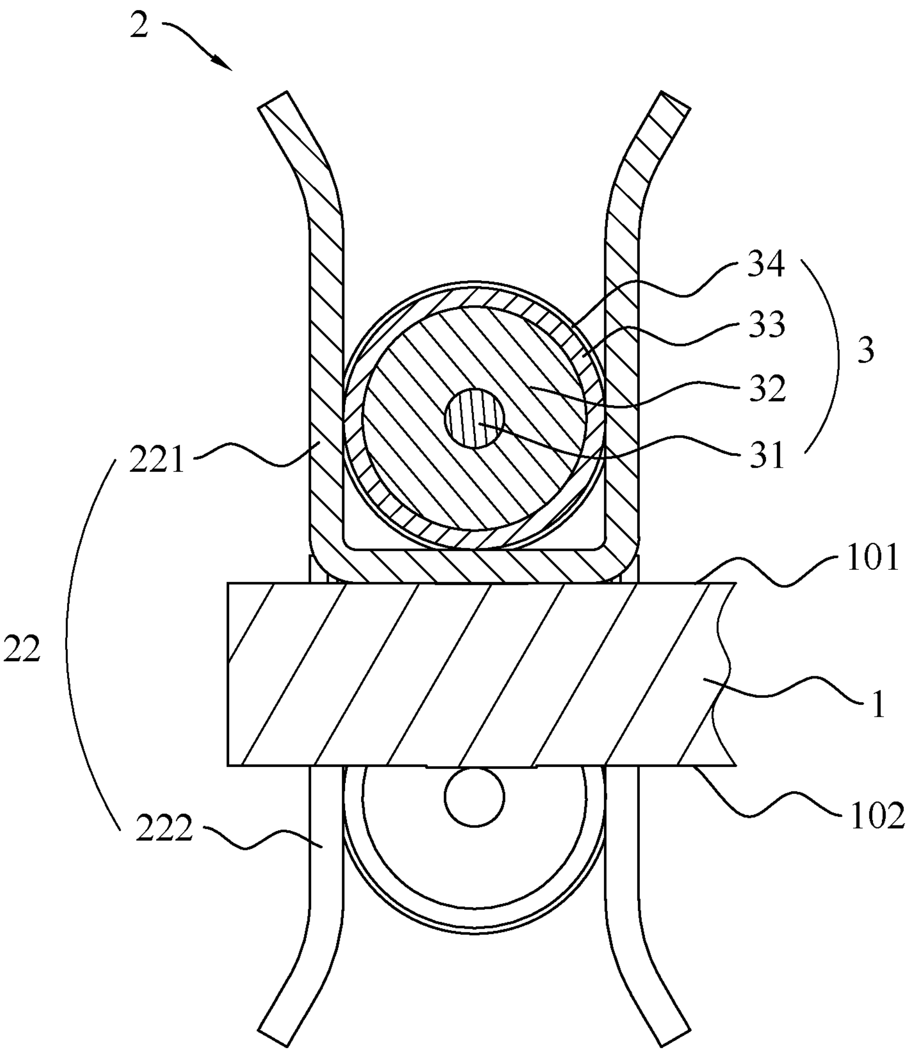
FIG. 6 is sectional view of the cable connector assembly along a line I-I shown in FIG. 4.
Figure 7:
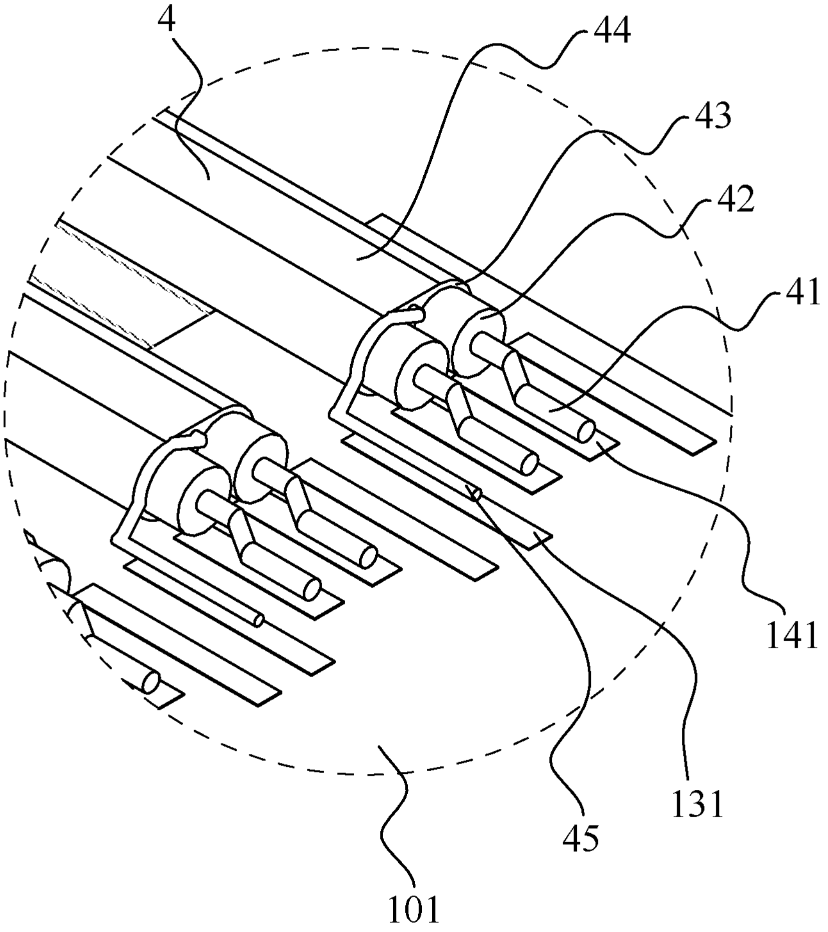
FIG. 7 is an enlarged view of an encircled portion A of the cable connector assembly of FIG. 1.
Figure 8:
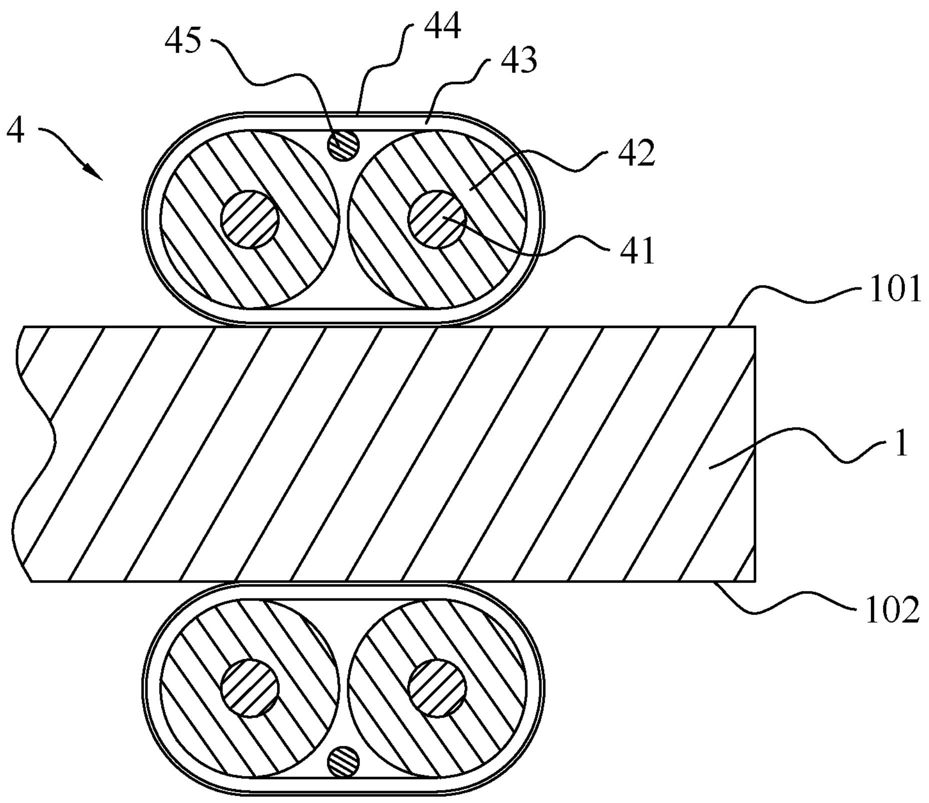
FIG. 8 is a sectional view of the cable connector assembly along a line II-II shown in FIG. 4.

Referring to FIG. 5 and FIG. 6, each low-speed signal cable 3 has a low-speed signal conduction core 31, a first inner insulation layer 32 covered outside the low-speed signal conduction core 31, a shielding layer 33 covered outside the first inner insulation layer 32, and a first outer insulation layer 34 covered outside the shielding layer 33. The first low-speed signal cable 301 has the low-speed signal conduction core 31, the first inner insulation layer 32, the shielding layer 33 and the first outer insulation layer 34. The low-speed signal conduction core 31 is soldered to the first low-speed signal conducting section 121. The low-speed signal conduction core 31 of the first low-speed signal cable 301 is electrically connected to the first low-speed signal conducting section 121. The shielding layer 33 of the first low-speed signal cable 301 is mounted on a top surface of the base portion 21 of the grounding structure 2. The shielding layer 33 of the first low-speed signal cable 301 is clamped by the upper clamping section 221. The second low-speed signal cable 302 has the low-speed signal conduction core 31, the first inner insulation layer 32, the shielding layer 33 and the first outer insulation layer 34. The low-speed signal conduction core 31 of the second low-speed signal cable 302 is soldered to the second low-speed signal conducting section 122. The low-speed signal conduction core 31 of the second low-speed signal cable 302 is electrically connected to the second low-speed signal conducting section 122. The shielding layer 33 of the second low-speed signal cable 302 is positioned behind the rear edge of the circuit board 1. The first outer insulation layer 34 of one end of the low-speed signal conduction core 31 is peeled off to make the shielding layer 33 is partially exposed outside, and the shielding layer 33 is made of a woven mesh conduction material. The shielding layer 33 of the first low-speed signal cable 301 is clamped by the upper clamping section 221. The shielding layer 33 of the second low-speed signal cable 302 is clamped by the lower clamping section 222.

The upper clamping section 221 and the lower clamping section 222 are arranged to simultaneously clamp the exposed shielding layers 33 of the two low-speed signal cables 3, in this way, the exposed shielding layers 33 of the two low-speed signal cables 3 are fastened by the upper clamping section 221 and the lower clamping section 222. The two low-speed signal cables 3 are connected with the grounding structure 2 via the shielding layers 33 of the two low-speed signal cables 3 to achieve the grounding effect, so interference signals are prevented from entering the low-speed signal conduction core 31, and then losses of transmitted signals are reduced. Two fronts of the two shielding layers 33 of the first low-speed signal cable 301 and the second low-speed signal cable 302 are exposed outside. The front of the shielding layer 33 of the first low-speed signal cable 301 is positioned on a top surface of the base portion 21 of the grounding structure 2. Two rears of the two shielding layers 33 of the first low-speed signal cable 301 and the second low-speed signal cable 302 are positioned behind the rear edge of the circuit board 1. The shielding layer 33 of the first low-speed signal cable 301 is connected between the low-speed signal grounding section 11 and the first low-speed signal conducting section 121, the shielding layer 33 of the second low-speed signal cable 302 is connected between the low-speed signal grounding section 11 and the second low-speed signal conducting section 122. The low-speed signal grounding section 11, the plurality of the first high-speed signal grounding sections 131 and the plurality of the first high-speed signal conducting sections 141 are arranged along a transverse direction. The first low-speed signal conducting section 121 is positioned in front of the low-speed signal grounding section 11. The first low-speed signal conducting section 121 is positioned in front of the first high-speed signal grounding section 131 and the first high-speed signal conducting section 141. Rears of the plurality of the first high-speed signal grounding sections 131 are aligned with rears of the plurality of the first high-speed signal conducting sections 141 along the transverse direction. A rear of the second low-speed signal conducting section 122 is aligned with the plurality of the second high-speed signal grounding sections 132 and the plurality of the second high-speed signal conducting sections 142 along the transverse direction.

Because the two low-speed signal cables 3 which are woven mesh shielding structures are difficult to be integrated with the circuit board 1 by the hot-bar process, the two low-speed signal cables 3 of the cable connector assembly 100 utilizes the grounding structure 2 to clamp and fasten the shielding layers 33 of the two low-speed signal cables 3 to replace the hot-bar process. When the shielding layers 33 of the two low-speed signal cables 3 are soldered to the grounding structure 2 which is mounted to the circuit board 1, dispersing conditions and diverging conditions of the shielding layers 33 of the two low-speed signal cables 3 are prevented, correspondingly, soldering defect conditions, poorer anti-interference effects and other problems are prevented. In this invention, the upper clamping section 221 and the lower clamping section 222 are provided in pairs, and the upper clamping section 221 and the lower clamping section 222 are disposed oppositely along an up-down direction to reduce a volume of the grounding structure 2. The first low-speed signal cable 301 and the second low-speed signal cable 302 are provided in pairs, and the first low-speed signal cable 301 and the second low-speed signal cable 302 are disposed oppositely along the up-down direction.

Referring to FIG. 1 to FIG. 8, each high-speed signal cable 4 is a differential signal pair. Each high-speed signal cable 4 has at least two high-speed signal conduction cores 41, a second inner insulation layer 42, a high-speed signal grounding wire 45 arranged between two second inner insulation layers 42, a cladding layer 43 and a second outer insulation layer 44. The high-speed signal conduction core 41 of each high-speed signal cable 4 is covered with a second inner insulation layer 42. The two second inner insulation layers 42 and the high-speed signal grounding wire 45 of each high-speed signal cable 4 are sequentially surrounded by the cladding layer 43 and the second outer insulation layer 44. The high-speed signal grounding wire 45 and the cladding layer 43 of each high-speed signal cable 4 are contacted. The plurality of the high-speed signal cables 4 have a plurality of the high-speed signal conduction cores 41 soldered to the plurality of first high-speed signal conducting sections 141 and the plurality of the second high-speed signal conducting sections 142. The high-speed signal conduction cores 41 of the plurality of the high-speed signal cables 4 are electrically connected to the plurality of the first high-speed signal conducting sections 141 and the plurality of the second high-speed signal conducting sections 142 of the circuit board 1. The plurality of the high-speed signal cables 4 are transversely arranged in two rows. One row of the high-speed signal cables 4 are arranged transversely in the upper surface 101, and the other row of the high-speed signal cables 4 are arranged transversely in the lower surface 102. The high-speed signal grounding wires 45 of the plurality of the high-speed signal cables 4 contact the first high-speed signal grounding sections 131 and the second high-speed signal grounding sections 132 of the circuit board 1, the high-speed signal grounding wires 45 of the plurality of the high-speed signal cables 4 are electrically connected with the first high-speed signal grounding sections 131 and the second high-speed signal grounding sections 132 of the circuit board 1, and the high-speed signal grounding wires 45 of the plurality of the high-speed signal cables 4 are conductive with the first high-speed signal grounding sections 131 and the second high-speed signal grounding sections 132 of the circuit board 1 to achieve the grounding effect.

In this preferred embodiment, the plurality of the high-speed signal cables 4 are soldered to the circuit board 1 by a way of the hot-bar process, and the plurality of the high-speed signal cables 4 are fastened to the circuit board 1. At first, coat solder pastes (not shown) to the first high-speed signal conducting sections 141, the second high-speed signal conducting sections 142, and the first high-speed signal grounding sections 131 and the second high-speed signal grounding sections 132 of the circuit board 1 and heat the solder pastes to melt the solder pastes by a solder reflow furnace. Then position the high-speed signal conduction cores 41 of the plurality of the high-speed signal cables 4 to the plurality of the first high-speed signal conducting sections 141 and the second high-speed signal conducting sections 142 of the circuit board 1, and position the high-speed signal grounding wires 45 of the plurality of the high-speed signal cables 4 to the first high-speed signal grounding sections 131 and the second high-speed signal grounding sections 132 of the circuit board 1. At last, utilize a thermode to solder the high-speed signal conduction cores 41 and the high-speed signal grounding wires 45 of the plurality of the high-speed signal cables 4 by a press soldering way, so the plurality of the high-speed signal cables 4 and the circuit board 1 are integrated.

As described above, the cable connector assembly 100 includes the two low-speed signal cables 3 and the plurality of the high-speed signal cables 4 disposed to the upper surface 101 and the lower surface 102 of the circuit board 1, and the grounding structure 2 fixed to the low-speed signal grounding section 11 of the upper surface 101 of the circuit board 1, the plurality of the high-speed signal cables 4 are soldered to the upper surface 101 and the lower surface 102 of the circuit board 1 by the way of the hot-bar process, the two low-speed signal cables 3 are clamped by the two clamping portions 22 of the grounding structure 2, the shielding layer 33 of the low-speed signal cable 3 of the upper surface 101 of the circuit board 1 is clamped by the upper clamping section 221, the shielding layer 33 of the low-speed signal cable 3 of the lower surface 102 of the circuit board 1 is clamped by the lower clamping section 222, the base portion 21 of the grounding structure 2 is electrically connected to the low-speed signal grounding section 11 of the upper surface 101 of the circuit board 1, so that the shielding layers 33 of the two low-speed signal cables 3 are electrically connected to the low-speed signal grounding section 11 of the upper surface 101 of the circuit board 1 through the grounding structure 2, and the first low-speed signal cable 301 and the second low-speed signal cable 302 of the two low-speed signal cables 3 achieve a common ground structure to reach the better grounding effect. In this way, the cable connector assembly 100 is able to improve a grounding way of the two low-speed signal cables 3 which are the coaxial cables of the cable connector assembly 100 to overcome a problem that the shielding layers 33 of the two low-speed signal cables 3 are difficult to be soldered to the circuit board 1, and anti-interference capabilities of the two low-speed signal cables 3 are effectively improved. In addition, the lower surface 102 of the circuit board 1 is needless to be provided with the low-speed signal grounding section 11, a wire layout range of the circuit board 1 is increased. Furthermore, the upper clamping section 221 and the lower clamping section 222 are provided in pairs, and the upper clamping section 221 and the lower clamping section 222 are disposed oppositely along the up-down direction to reduce the volume of the grounding structure 2.

The invention claimed is:

1. A cable connector assembly, comprising:

a circuit board having an upper surface, and a lower surface opposite to the upper surface, the upper surface being provided with a low-speed signal grounding section and a first low-speed signal conducting section, the lower surface being provided with a second low-speed signal conducting section;

a grounding structure fastened on the circuit board, the grounding structure including a base portion, and two clamping portions perpendicularly bent oppositely from the base portion, the base portion being electrically conductive with the low-speed signal grounding section, the two clamping portions including an upper clamping section positioned on the upper surface, and a lower clamping section positioned at the lower surface; and two low-speed signal cables mounted at one side of the upper surface and one side of the lower surface of the circuit board, the two low-speed signal cables being electrically connected to the circuit board, the two low-speed signal cables including a first low-speed signal cable and a second low-speed signal cable, the first low-speed signal cable and the second low-speed signal cable being mounted to the upper surface and the lower surface of the circuit board, respectively, each low-speed signal cable having a low-speed signal conduction core, a first inner insulation layer covered outside the low-speed signal conduction core, and a shielding layer covered outside the first inner insulation layer, the low-speed signal conduction core of the first low-speed signal cable being electrically connected to the first low-speed signal conducting section, the low-speed signal conduction core of the second low-speed signal cable being electrically connected to the second low-speed signal conducting section, the first low-speed signal cable and the second low-speed signal cable being disposed oppositely along an up-down direction, the shielding layer of the first low-speed signal cable being clamped by the upper clamping section, and the shielding layer of the second low-speed signal cable being clamped by the lower clamping section.

2. The cable connector assembly as claimed in claim 1, wherein the upper surface is provided with a plurality of first high-speed signal conducting sections and a plurality of first high-speed signal grounding sections, the lower surface is provided with a plurality of second high-speed signal grounding sections and a plurality of second high-speed signal conducting sections, the cable connector assembly further includes a plurality of high-speed signal cables which are mounted at the other side of the upper surface and the other side of the lower surface of the circuit board, the plurality of the high-speed signal cables are disposed symmetrically with respect to the circuit board, each high-speed signal cable has at least two high-speed signal conduction cores and a high-speed signal grounding wire, the high-speed signal conduction cores of the plurality of the high-speed signal cables are electrically connected to the plurality of the first high-speed signal conducting sections and the second high-speed signal conducting sections, the high-speed signal grounding wires of the plurality of the high-speed signal cables are electrically connected with the first high-speed signal grounding sections and the second high-speed signal grounding sections of the circuit board.

3. The cable connector assembly as claimed in claim 1, wherein the two low-speed signal cables are coaxial cables.

4. The cable connector assembly as claimed in claim 1, wherein the shielding layer is made of a woven mesh conduction material.

5. The cable connector assembly as claimed in claim 1, wherein the base portion is formed in a flat shape, the upper clamping section is bent upward from two sides of a front end of the base portion, the upper clamping section is fastened to a top surface of the low-speed signal grounding section, the lower clamping section is bent downward from two sides of a rear end of the base portion, and the lower clamping section is disposed at a rear edge of the circuit board, the base portion is soldered to the low-speed signal grounding section.

6. The cable connector assembly as claimed in claim 1, wherein the base portion further has an opening hole vertically penetrating through the base portion, when the grounding structure is soldered to the circuit board, the opening hole accommodates overflowing solders.

7. The cable connector assembly as claimed in claim 1, wherein the base portion is fastened on a top surface of the low-speed signal grounding section.

8. The cable connector assembly as claimed in claim 1, wherein the two low-speed signal cables are connected with the grounding structure via the shielding layers of the two low-speed signal cables, two fronts of the two shielding layers of the first low-speed signal cable and the second low-speed signal cable are exposed outside, the front of the shielding layer of the first low-speed signal cable is positioned on a top surface of the base portion of the grounding structure, two rears of the two shielding layers of the first low-speed signal cable and the second low-speed signal cable are positioned behind a rear edge of the circuit board, the shielding layer of the first low-speed signal cable is connected between the low-speed signal grounding section and the first low-speed signal conducting section, the shielding layer of the second low-speed signal cable is connected between the low-speed signal grounding section and the second low-speed signal conducting section.

9. The cable connector assembly as claimed in claim 1, wherein the first low-speed signal cable and the second low-speed signal cable are provided in pairs.

10. A cable connector assembly, comprising:

a circuit board having an upper surface provided with a low-speed signal grounding section, a first low-speed signal conducting section positioned in front of the low-speed signal grounding section, a plurality of first high-speed signal grounding sections and a plurality of first high-speed signal conducting sections, the low-speed signal grounding section, the plurality of the first high-speed signal grounding sections and the plurality of the first high-speed signal conducting sections being arranged along a transverse direction, rears of the plurality of the first high-speed signal grounding sections being aligned with rears of the plurality of the first high-speed signal conducting sections along the transverse direction, and a lower surface opposite to the upper surface, the lower surface being provided with a second low-speed signal conducting section, a plurality of second high-speed signal grounding sections and a plurality of second high-speed signal conducting sections, a rear of the second low-speed signal conducting section being aligned with the plurality of the second high-speed signal grounding sections and the plurality of the second high-speed signal conducting sections along the transverse direction;

a grounding structure fastened on the circuit board, the grounding structure including a base portion soldered to the low-speed signal grounding section, the base portion being electrically conductive with the low-speed signal grounding section, an upper clamping section fastened on the upper surface of the circuit board, the upper clamping section being bent upward from two sides of a front end of the base portion, and a lower clamping section disposed at a rear edge of the circuit board, and the lower clamping section being bent downward from two sides of a rear end of the base portion;

a first low-speed signal cable mounted to one side of the upper surface of the circuit board, the first low-speed signal cable having a low-speed signal conduction core soldered to the first low-speed signal conducting section, the low-speed signal conduction core of the first low-speed signal cable being electrically connected to the first low-speed signal conducting section, and a shielding layer clamped by the upper clamping section;

a second low-speed signal cable mounted to one side of the lower surface of the circuit board, the second low-speed signal cable having a low-speed signal conduction core soldered to the second low-speed signal conducting section, the low-speed signal conduction core of the second low-speed signal cable being electrically connected to the second low-speed signal conducting section, and a shielding layer clamped by the lower clamping section; and a plurality of high-speed signal cables mounted at the other side of the upper surface and the other side of the lower surface of the circuit board, the plurality of the high-speed signal cables being disposed symmetrically with respect to the circuit board, the plurality of the high-speed signal cables having a plurality of high-speed signal conduction cores soldered to the plurality of the first high-speed signal conducting sections and the plurality of the second high-speed signal conducting sections.

11. The cable connector assembly as claimed in claim 10, wherein the shielding layer of the first low-speed signal cable is mounted on a top surface of the base portion of the grounding structure, the shielding layer of the second low-speed signal cable is positioned behind the rear edge of the circuit board.

12. The cable connector assembly as claimed in claim 10, wherein the base portion is formed in a flat shape, the upper clamping section and the lower clamping section are disposed oppositely along an up-down direction.

13. A cable connector assembly, comprising:

a circuit board having an upper surface, and a lower surface opposite to the upper surface, the upper surface being provided with a low-speed signal grounding section and a first low-speed signal conducting section, the lower surface being provided with a second low-speed signal conducting section;

a grounding structure fastened on the circuit board, the grounding structure including a base portion and two clamping portions, the base portion being electrically conductive with the low-speed signal grounding section, the two clamping portions including an upper clamping section and a lower clamping section, the upper clamping section being bent upward from two sides of a front end of the base portion, the upper clamping section being fastened to a top surface of the low-speed signal grounding section, the lower clamping section being bent downward from two sides of a rear end of the base portion, and the lower clamping section being disposed at a rear edge of the circuit board;

two low-speed signal cables mounted at one side of the upper surface and one side of the lower surface of the circuit board, the two low-speed signal cables being electrically connected to the circuit board, the two low-speed signal cables including a first low-speed signal cable and a second low-speed signal cable, the first low-speed signal cable and the second low-speed signal cable being mounted to the upper surface and the lower surface of the circuit board, respectively, each low-speed signal cable having a low-speed signal conduction core, a first inner insulation layer covered outside the low-speed signal conduction core, and a shielding layer covered outside the first inner insulation layer, the low-speed signal conduction core of the first low-speed signal cable being electrically connected to the first low-speed signal conducting section, the low-speed signal conduction core of the second low-speed signal cable being electrically connected to the second low-speed signal conducting section, the first low-speed signal cable and the second low-speed signal cable being disposed oppositely along an up-down direction, the shielding layer of the first low-speed signal cable being clamped by the upper clamping section, and the shielding layer of the second low-speed signal cable being clamped by the lower clamping section, the two low-speed signal cables being connected with the grounding structure via the shielding layers of the two low-speed signal cables; and a plurality of high-speed signal cables mounted at the other side of the upper surface and the other side of the lower surface of the circuit board, the plurality of the high-speed signal cables being disposed symmetrically with respect to the circuit board.

* * * * *